Patented Apr. 28, 1942

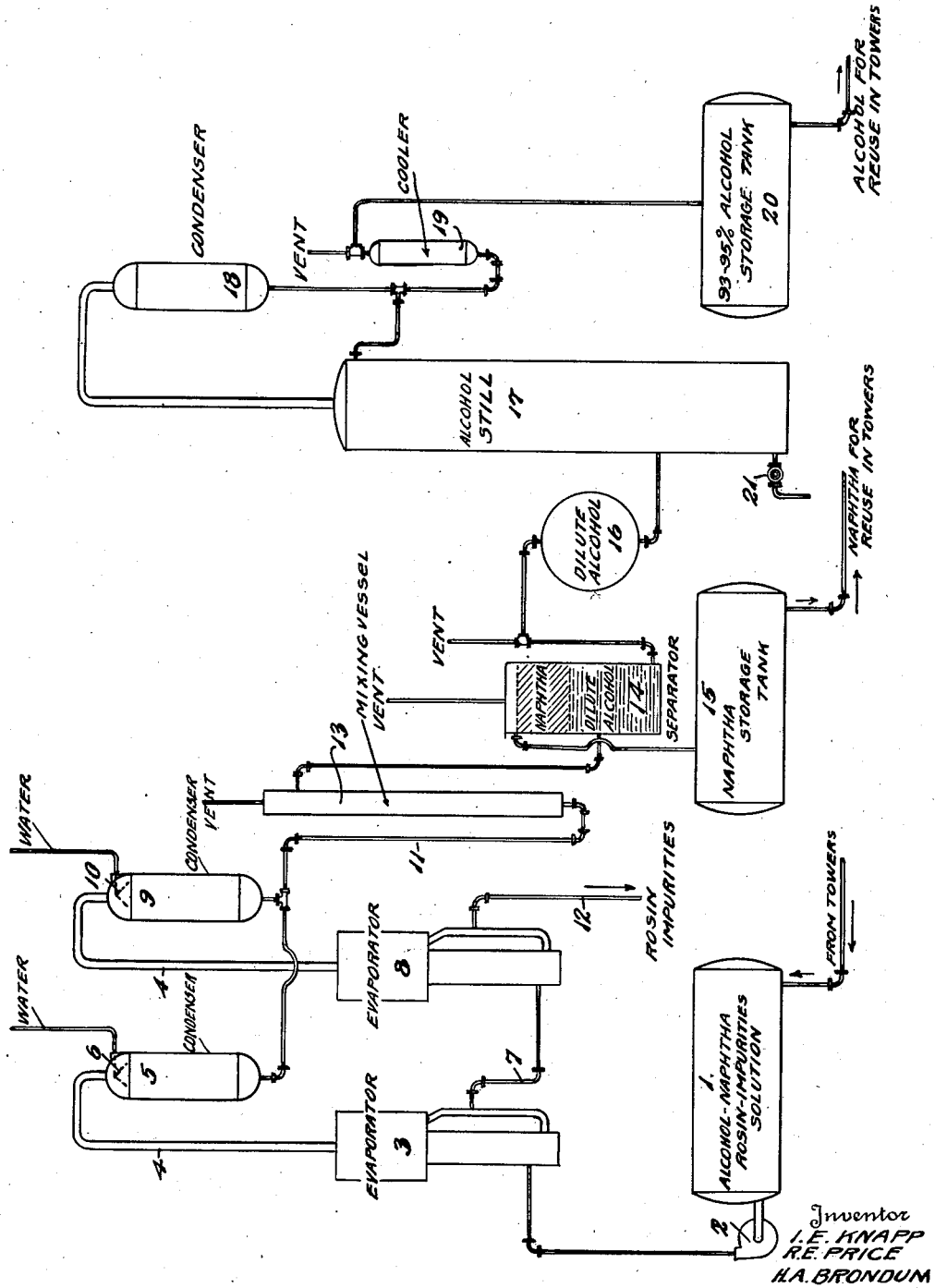

2,281,311

UNITED STATES PATENT OFFICE 2,281,311

METHOD FOR RECOVERING ALCOHOL FROM ALCOHOLIC MIXTURES

Ismond E. Knapp, Robert E. Price and Herman A. Brondum, Picayune, Miss., assignors to Crosby Naval Stores, Incorporated, Picayune, Miss., a corporation of Mississippi Application April 6, 1940, Serial No. 328,386

6 Claims. (Cl. 202—60)

The present invention relates to an improved method of recovering substantially pure alcohols from alcoholic mixtures containing varying proportions of hydrocarbon solvents, and is more particularly concerned with the recovery of water-soluble alcohols from ternary mixtures of the latter with hydrocarbons and water. In its more specific aspect the invention contemplates and provides an improved method of recovering substantially pure ethyl alcohol of from 93 to 95% strength from alcoholic mixtures of rosin, and/or rosin impurities and rosin color bodies, which mixtures also contain varying amounts of a hydrocarbon solvent, such as petroleum naphtha.

In the purification or decolorization of wood rosin it is known to contact a naphtha solution of the rosin with various adsorption agents. These adsorption agents in time become saturated with rosin impurities and/or color bodies, and it becomes necessary in the commercial operation of such a process to revivify or restore the adsorptive material to its original condition. This may be done, as more fully described hereinafter, by treating the adsorptive material either with a mixed organic solvent such as a mixture of ethyl alcohol and petroleum naphtha, or with ethyl alcohol alone. In any case the revivification solvent dissolves the rosin impurities and/or color bodies (conveniently referred to here merely as rosin impurities) off the adsorbent. A solution of rosin impurities is thus obtained from which the revivification solvent must be recovered for further use in the process.

In use today there are at least two commercial processes in which the impure rosin solution is percolated through a tower of an adsorption agent until the latter is saturated with rosin impurities and then the adsorption agent is subsequently treated or revivified by flushing the tower with various solvents. One of these processes employs dehydrated fuller's earth as an adsorption medium and the revivification is carried out through the use of an anhydrous mixed organic solvent, such as a mixture of anhydrous ethyl alcohol and petroleum naphtha. In this process special precautions are taken to prevent access of water to the system and the alcohol-naphtha-rosin impurities solution must be maintained in a practically anhydrous condition. By so doing advantage is taken of the well-known fact that anhydrous ethyl alcohol and naphtha form an azeotropic mixture so that the alcohol-naphtha-rosin impurities solution is simply run into a still or evaporator and subjected to distillation. The distillate consists of a mixture of alcohol and naphtha in the proportion of approximately 35 parts of ethyl alcohol to 65 parts of naphtha. The naphtha being present in excess, this 35-65 mixture continues to distill over until all the alcohol has been recovered from the solution. Since the solution is substantially free of water, this 35-65 mixture is obtained as a homogeneous liquid distillate which is re-used for revivification as if it were a single solvent. As stated, the process is advantageous because the solvent mixture is azeotropic and may be recovered by simple distillation. On the other hand, the fact that the entire system must be maintained in a substantially anhydrous condition renders the whole process economically unattractive.

Another commercial process (hereinafter referred to as the Price process) is carried out substantially in accordance with the disclosure in U. S. Patent No. 2,181,791 to R. E. Price and the solvent recovery system of the present invention is particularly adapted to the rosin purification process of this Price patent. In practical operation the Price process, employing magnesium silicate as the adsorbent medium, need not be carried out under anhydrous conditions. Consequently, the magnesium silicate is not dehydrated and the revivification solvent is ordinary, inexpensive, commercial 93 to 95% ethyl alcohol. This is a distinct advantage over the aforementioned process employing dehydrated fuller's earth and an anhydrous revivification solvent.

After the adsorbent in a percolation tower of the Price process has become sufficiently saturated with rosin impurities, the naphtha solution of the rosin which is being purified is displaced with fresh naphtha. This in turn is displaced by pumping warm alcohol through the tower which dissolves the rosin impurities off the adsorbent. This solution of rosin impurities in alcohol is displaced with more alcohol which acts as a "wash" or a "rinse," and it in turn is displaced by pumping in fresh naphtha which is preferably preheated to say 70-100° C. in order to insure the removal of all the alcohol from the adsorbent. The alcohol-rosin impurities solution is pumped to a suitable tank which acts as a feed tank for a suitable still or evaporator.

It is essential that no alcohol remain in the tower for if it did, it would later appear in the naphtha solution of the dark rosin which is being decolorized and would then greatly lower the efficiency of the adsorption agent. In order to keep all alcohol out of the naphtha or naphtha-rosin solution, it is customary to regulate the valves on the towers and pumps so that some naphtha is pumped into the alcohol-rosin impurities feed tank. This is purely a precautionary measure, and it will be readily understood by one skilled in the art that pumping some naphtha into the alcohol-rosin impurities tank is the simplest way of flushing out the pipe lines, pumps, and towers, etc., and eliminating the danger of contaminating the rosin-naphtha solution with alcohol. In actual plant operation the net result is that the alcohol-rosin impurities solution in the evaporation feed tank may contain as much as 30 to 40% of naphtha. The problem and prime object of the present invention, therefore, is to recover the alcohol from this solution.

It should be pointed out that in describing the present invention, the word "solution" is not used in the true sense of that term. Because of the presence of water, the naphtha-alcohol rosin impurities actually form, with the water, a mixture rather than a true solution. In other words, after revivification, the material in the evaporation feed tank from which the alcohol is to be recovered consists of a mixture of alcohol, water, naphtha, and rosin impurities. This mixture is formed by the collection of the fluids which are successively passed through the towers in the revivification process, and at no time is there ever a true solution of alcohol and naphtha either in the towers or in the evaporation feed tank.

Since the alcohol used in the revivification contained from 5 to 7% water, this water will be present in the alcohol-naphtha-rosin impurities solution, and if this solution is subjected to distillation, the water will vaporize and come over with the alcohol and naphtha. Although anhydrous ethyl alcool and naphtha are readily and completely miscible in all proportions to give a true solution, as above explained, this is not the case with 93–95% ethyl alcohol and naphtha. Such a mixture separates into two layers, the upper one being predominantly naphtha with a relatively small amount, say approximately 10 to 15% at ordinary room temperature, of alcohol dissolved in it, whereas the lower layer is predominantly alcohol with a considerable proportion, say up to 40% or more, of naphtha dissolved in it. The partition of the two solvents between the two layers is dependent on their relative proportions in the total mixture, on the temperature, and on the percentage of water present. The composition of the distillate from the alcohol-naphtha-rosin impurities solution, if subjected to simple distillation, is such that it separates into two layers, both of which are mixtures of alcohol and naphtha in varying proportions.

It is known that alcohol, water, and naphtha form a ternary mixture which boils at a temperature lower than that of any one of its three components, namely at approximately 73–74° C. under 760 mm. pressure. If only small amounts of water and naphtha are mixed with a large volume of alcohol, the ternary mixture will distill over first and will continue until all the water has been vaporized. Then a mixture of anhydrous ethyl alcohol and naphtha will distill over until the naphtha has been removed, and finally anhydrous ethyl alcohol will come over.

It is practically impossible, however, to obtain alcohol free from naphtha by the simple distillation of the alcohol-naphtha-rosin impurities solution. This is due to the fact that there is too much water and too much naphtha in the solution to permit their separation from the bulk of the alcohol by means of the ternary mixture above mentioned. What actually happens is that the alcohol, naphtha and water all distill over and then the distillate separates into two layers, neither of which is pure alcohol or alcohol free from naphtha. These layers can be separated by gravity, and each layer re-distilled through an efficient fractionating column but even then the alcohol recovered will not be free from naphtha.

It is essential, therefore, to the successful commercial operation of the Price process that a method be devised by which the alcohol can be efficiently recovered from the alcohol-naphtha-rosin impurities solution. We have discovered such a method and have found that it works very satisfactorily on plant scale. Essentially our process consists in distilling the alcohol-naphtha-rosin impurities solution continuously and showering cold water into the mixed vapors as they pass into a condenser. The condensate, consisting of alcohol, naphtha and a considerable volume of water, is run through a mixing vessel into a suitable separator. The flow of water is so regulated that the volume added is approximately equal to the volume of alcohol distilling, with the result that the lower layer in the separator is approximately 45–50% alcohol and 50–55% water. Under these conditions, the separation of the naphtha is practically quantitative, and when the top layer (naphtha) is decanted from the separator it is substantially free from alcohol, in fact it contains ordinarily not more than a trace of alcohol. This is suitable for re-use without further treatment. If the apparatus used provides efficient contact, mixing and separation, the lower layer will contain no naphtha. This lower layer is run to a continuous fractionating column in which the alcohol taken off overhead shows no naphtha and analyzes 93 to 95% ethyl alcohol. It is re-used as a revivification solvent. The water, of course, is lost as "slop" to the sewer.

In order to illustrate our invention more clearly we show in the accompanying drawing a diagrammatic layout of equipment which we have found satisfactory for effecting the recovery of alcohol from a solution of rosin impurities in alcohol, containing a variable percentage of naphtha.

The rosin impurities-alcohol-naphtha solution from the revivified towers is accumulated in a suitable evaporation feed tank 1 and by means of a pump 2 it is pumped to a steam-heated vertical-tube evaporator 3. The mixed alcohol and naphtha vapors leave the evaporator through pipe 4 and pass into condenser 5. This is a tubular water-cooled condenser of conventional type but in the vapor space above the tube-sheet there is inserted a spray nozzle 6 through which cold water is pumped. This water spray mixes intimately with the alcohol and naphtha vapors as they condense.

The concentrated rosin impurities-alcohol-naphtha solution passes from evaporator 3 through pipe 7 to another evaporator 8. Rosin impurities leave this evaporator through pipe 12. As before, the alcohol and naphtha vapors pass into condenser 9 which is equipped with a water spray 10 similar to spray 6 in the top of condenser 5.

The mixture of alcohol, water and naphtha leaves condensers 5 and 9 and passes through pipe 11 into a mixing vessel 13, from which it overflows into separator 14. Here the mixed liquids separate by gravity and the naphtha rises to the top and overflows into naphtha storage tank 15. The alcohol-water layer settles to the bottom of the separator and passes into dilute alcohol feed tank 16. From here it passes into continuous alcohol still 17. The recovered alcohol is condensed in condenser 18 and passes through cooler 19 into alcohol storage tank 20. The water is drawn off the bottom of the still 17 and goes to the sewer through pipe 21.

It is to be understood that many variations can be made in the arrangement of apparatus, piping, etc., without departing from the essence of our invention. For example, the water may be added to the alcohol-naphtha mixture after condensation and the mixture pumped through a plurality of mixing nozzles, or it may merely be pumped by means of a centrifugal pump into suitable tanks and separators; or it may be pumped through or into a series of tanks and/or pipes in which there are propeller type agitators. Another procedure which we have used on a large scale is to run the alcohol-naphtha condensate into the bottom of an upright tank containing water. A variation of this procedure is to have a series of baffle plates in the mixing tank and to pump a stream of water into the tank along with the alcohol-naphtha condensate allowing the mixture to overflow from the mixing tank to a suitable separator. Other variations of effecting intimate contact between water and the alcohol-naphtha condensate may be used but we have found that by contacting the alcohol-naphtha mixture in the vapor phase with water in a manner described above provides the most rapid and generally efficient method.

It is also obvious that the use of a continuous still is not essential to the recovery of alcohol according to our invention. For example, the alcohol-water layer from the separator can be run into a storage tank of a suitable size and then can be distilled in batches in a suitable still equipped with an efficient fractionating column.

It is also to be understood that this method of recovery of alcohol from an alcohol-rosin impurities solution containing naphtha is not limited to ethyl alcohol. We have found that our method is also applicable to other water-soluble alcohols, such as methyl alcohol and iso-propyl alcohol.

Our invention, furthermore, is not limited to the separation of water-soluble alcohols from any particular petroleum naphtha. Since the method does not depend upon any specific difference in the boiling points or vapor pressures of the two solvents to be separated, it can be applied to mixtures of alcohol with various petroleum hydrocarbon solvents, such as extraction naphthas, varnish makers and painters naphthas, the so-called Stoddard Solvent, mineral spirits, thinners, gasolines, etc. The method also is applicable to alcoholic solutions containing a variable percentage of aromatic hydrocarbons such as benzene, toluene and the like.

What we claim is:

1. A process for separating and recovering substantially pure ethyl alcohol of 93-95% strength from a mixture of ethyl alcohol, water and naphtha which comprises distilling the mixture, contacting the alcohol-naphtha vapors with water, collecting and settling the resulting diluted alcohol-naptha condensate to form layers, separating the layer of substantially pure naphtha, distilling the ethyl alcohol-water layer, and recovering substantially pure 93-95% ethyl alcohol.

2. A process for separating and recovering a substantially pure alcohol from a mixture of the alcohol, water and a petroleum hydrocarbon which comprises distilling the mixture, continuously contacting the alcohol-petroleum hydrocarbon vapors with water, continuously collecting and settling the resulting diluted alcohol-petroleum hydrocarbon condensate to form layers, separating the resulting substantially pure petroleum hydrocarbon layer from the alcohol-water layer, continuously distilling the latter layer and recovering substantially pure alcohol.

3. A process for separating and recovering a substantially pure alcohol from a mixture of the alcohol, water and a petroleum hydrocarbon which comprises distilling the mixture, contacting the alcohol-petroleum hydrocarbon vapors with water, collecting and settling the resulting diluted alcohol-petroleum hydrocarbon condensate to form layers, separating the layer of substantially pure petroleum hydrocarbon, distilling the alcohol-water layer and recovering substantially pure alcohol.

4. A process for separating and recovering substantially pure ethyl alcohol of 93-95% strength from a mixture of ethyl alcohol, water, rosin impurities and naphtha which comprises distilling the mixture, contacting the alcohol-naphtha vapors with water, collecting and settling the resulting diluted alcohol-petroleum hydrocarbon condensate to form layers, decanting the upper layer of substantially pure naphtha, distilling the lower ethyl alcohol-water layer and recovering substantially pure 93-95% ethyl alcohol.

5. In a process for revivifying adsorbent beds contaminated with wood rosin impurities wherein the bed is flushed with 93-95% ethyl alcohol, the alcohol is displaced from the bed by flushing with naphtha, and the alcohol, water, dissolved rosin impurities and naphtha are collected in a common receiver, the improvement which comprises distilling the collected mixture, contacting the alcohol-naphtha vapors with water, collecting and settling the resulting diluted alcohol-petroleum hydrocarbon condensate to form layers, separating the upper layer of substantially pure naphtha, and distilling the lower ethyl alcohol-water layer to recover substantially pure 93-95% ethyl alcohol in a condition which may be returned to a contaminated adsorbent bed for further revivification.

6. A process for separating and recovering a substantially pure alcohol from a mixture of the alcohol, water and a petroleum hydrocarbon, which comprises distilling the mixture, contacting the alcohol-petroleum hydrocarbon vapors with water in the form of a spray to mix a volume of water with the alcohol-petroleum naphtha vapors in an amount at least approximately equal to the volume of alcohol being distilled and condensed, collecting and settling the condensate to form layers, separating the layer of substantially pure petroleum hydrocarbon, distilling the alcohol-water layer and recovering substantially pure alcohol.

ISMOND E. KNAPP.
ROBERT E. PRICE.
HERMAN A. BRONDUM.